(12) United States Patent
Tawri et al.

(10) Patent No.: US 9,946,671 B1
(45) Date of Patent: Apr. 17, 2018

(54) METHODS AND SYSTEMS FOR PROCESSING READ AND WRITE REQUESTS

(71) Applicant: QLOGIC Corporation, Aliso Viejo, CA (US)

(72) Inventors: Deepak Tawri, Pune (IN); Vijay Thurpati, Pune (IN)

(73) Assignee: Cavium, Inc., San Jose, CA (US)

( * ) Notice: Subject to any disclaimer, the term of this patent is extended or adjusted under 35 U.S.C. 154(b) by 148 days.

(21) Appl. No.: 14/969,950

(22) Filed: Dec. 15, 2015

(51) Int. Cl.
*G06F 3/00* (2006.01)
*G06F 13/28* (2006.01)
*G06F 12/0879* (2016.01)
*G06F 12/0862* (2016.01)
*G06F 3/06* (2006.01)

(52) U.S. Cl.
CPC .......... *G06F 13/28* (2013.01); *G06F 12/0862* (2013.01); *G06F 12/0879* (2013.01); *G06F 3/0611* (2013.01); *G06F 2212/6042* (2013.01)

(58) Field of Classification Search
CPC .......................... G06F 12/0862; G06F 3/0611
See application file for complete search history.

(56) References Cited

U.S. PATENT DOCUMENTS

| | | | | |
|---|---|---|---|---|
| 6,219,693 B1* | 4/2001 | Napolitano | ........... | G06F 3/0611 |
| | | | | 707/E17.01 |
| 2010/0150174 A1* | 6/2010 | Bhide | ................. | H04L 67/1097 |
| | | | | 370/474 |

* cited by examiner

*Primary Examiner* — Zachary K Huson
(74) *Attorney, Agent, or Firm* — Klein, O'Neill & Singh, LLP (57) ABSTRACT

Methods and systems for processing an input/output (I/O) requests are provided. The method includes generating an I/O request by an initiator adapter of a computing device that interfaces with a target adapter; indicating by the initiator adapter that the I/O request is sequential in nature. When the I/O request is a sequential read request, the target adapter notifies a target controller to read-ahead data associated with other sequential read requests; and stores the read ahead data at a cache such that data for the other sequential read requests is provided from the cache instead of a storage device managed by the target controller. A sequential write request is processed without claiming any cache space, when data for the write request is not to be accessed within a certain duration.

20 Claims, 5 Drawing Sheets

| Ethernet Header 402 | FCOE Header 404 | SOF 406 | FC Header 408 | Pay Load 410 | FC CRC 412 | EOF 414 | Ethernet FCS 416 |

| | FC Header 408 ||||
|---|---|---|---|---|
| | 31      24 | 23      16 | 15      08 | 07 |
| | R_CTL 408C | D_ID || 408A |
| | CS_CTL/Priority | S_ID || 408B |
| | Type | F_CTL |||
| Word/Bits | SEQ_ID 408D | DF_CTL | SEQ_CNT 408E ||
| | OX_ID 408F || RX_ID ||
| | Parameter ||||

FIG. 4B

METHODS AND SYSTEMS FOR PROCESSING READ AND WRITE REQUESTS

TECHNICAL FIELD

The present invention relates to computing devices and adapters, and more particularly, to processing input/output requests using an adapter coupled to a computing device.

BACKGROUND

A computer network, often referred to simply as a network, is a group of interconnected computing devices that facilitates communication among users and allows users to share resources, for example, storage space at storage devices using a storage area network (SAN). Adapters, switches and routers may be used to interconnect network devices.

Initiators are commonly used to send input/output (I/O) requests for storing or reading data at storage devices that are managed by a target controller. An initiator may be an adapter for a computing device that sends out I/O requests for reading or writing data. A target adapter is an adapter coupled to the target controller and provides the I/O request to the target controller. The target controller executes the I/O requests to read and/or write data. Often the target controller uses a cache to store data that is requested by the initiator. The target controller may also use the cache to temporarily store data before data is written to a storage device. Continuous efforts are being made to efficiently process I/O requests.

BRIEF DESCRIPTION OF THE DRAWINGS

The various aspects relating to facilitating communication between devices in a network now will be discussed in detail with an emphasis on highlighting the advantageous features. These novel and non-obvious aspects are shown in the accompanying drawings, which are for illustrative purposes only. These drawings include the following figures, in which like numerals indicate like parts.

DETAILED DESCRIPTION

The following detailed description describes the present aspects with reference to the drawings. In the drawings, reference numbers label elements of the present aspects. These reference numbers are reproduced below in connection with the discussion of the corresponding drawing features.

As a preliminary note, any of the aspects described with reference to the figures may be implemented using software, firmware, hardware (e.g., fixed logic circuitry), manual processing, or a combination of these implementations. The terms "logic," "module," "component," "system" and "functionality," as used herein, generally represent software, firmware, hardware, or a combination of these elements. For instance, in the case of a software implementation, the terms "logic," "module," "component," "system," and "functionality" represent program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of non-transitory, medium for retaining information in any form, including various kinds of storage devices (magnetic, optical, static, etc.).

The aspects disclosed herein, may be implemented as a computer process (method), a computing system (or device), or as an article of manufacture, such as a computer program product or a non-transitory, computer-readable media. The computer program product may be non-transitory, computer storage media, readable by a computer device, and encoding a computer program of instructions for executing a computer process.

In one aspect, methods and systems for processing Input/Output (I/O) requests are provided. The method includes generating an I/O request by an initiator adapter of a computing device that interfaces with a target adapter; and indicating by the initiator adapter that the I/O request is sequential in nature. When the I/O request is a sequential read request, the target adapter notifies a target controller to read-ahead data associated with other sequential read requests; and stores the read ahead data at a cache such that data for the other sequential read requests is provided from the cache instead of a storage device managed by the target controller. A sequential write request is processed without claiming any cache space, when data for the write request is not to be accessed within a certain duration.

Figure 1A:
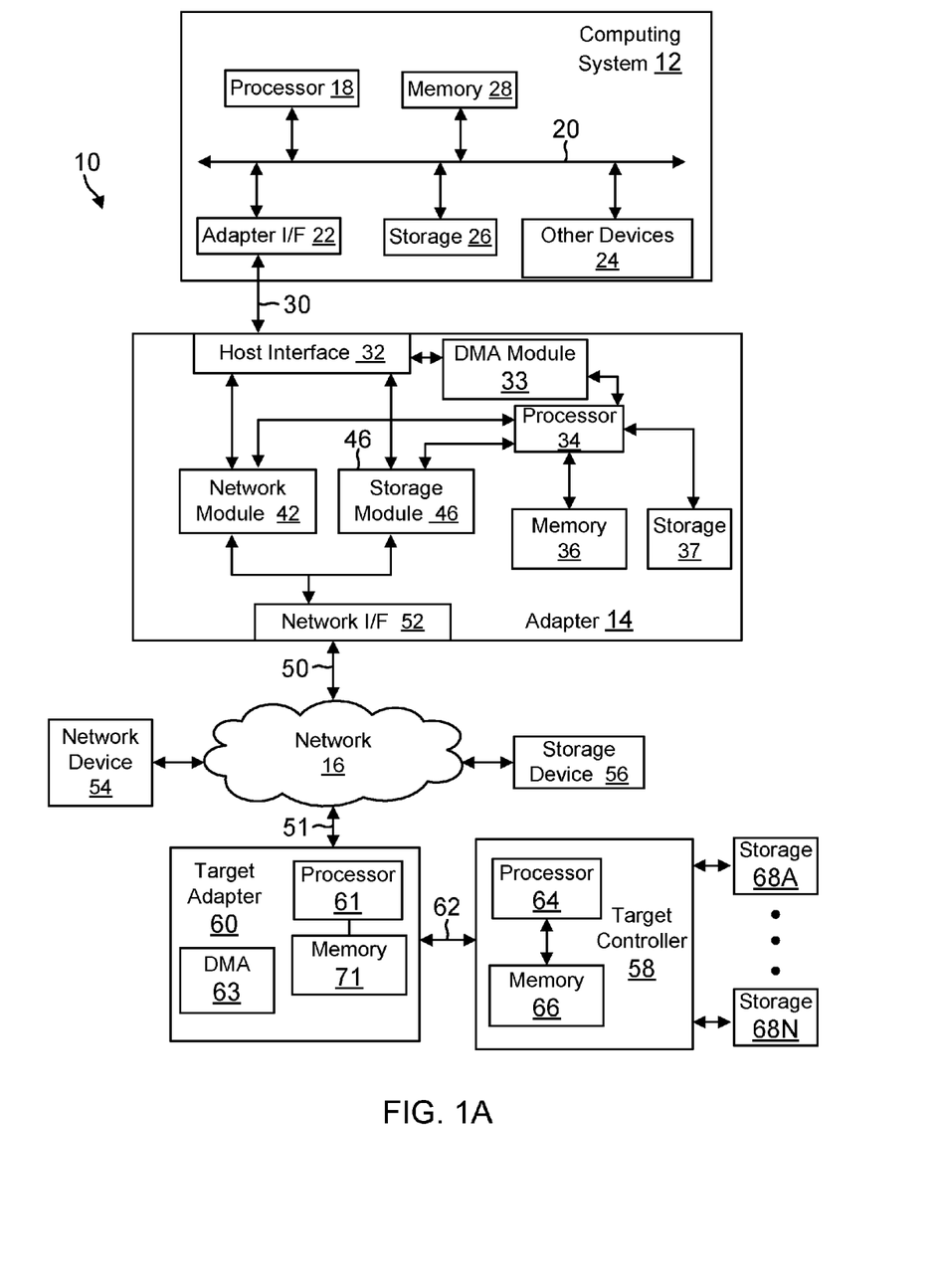
FIG. 1A is a system diagram showing components using the various aspects of the present disclosure.

System 10:

FIG. 1 is a block diagram of a system 10 configured for use with the various aspects of the present disclosure. The system 10 may include one or more computing device (or computing system) 12 (may also be referred to as "host system 12" or server 12) coupled to an adapter 14 (may also be referred to as initiator adapter 14) that interfaces with a network 16. The network 16 may include, for example, additional computing devices, servers, storage systems, etc.

The computing device 12 may include one or more processors (or processing logic) 18, also known as a central processing unit (CPU) coupled to a memory 28 via a computer bus (or interconnect) 20. The processor 18 executes computer-executable process steps out of memory 28. Processor 18 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices. The computer bus 20 may be, for example, a system bus, a Peripheral Component Interconnect (PCI) bus, PCI-Express (PCIe) bus, a Hyper-Transport or industry standard architecture (ISA) bus, a SCSI bus, a universal serial bus (USB), an Institute of Electrical and Electronics Engineers (IEEE) standard 1394 bus (sometimes referred to as "Firewire"), or any other type of bus.

Memory 28 provides the processor 18 with access to memory storage. Memory 28 may include random access main memory (RAM). When executing stored computer-executable process steps from a storage device, the processor 18 may store and execute the process steps out of RAM. Read only memory (ROM, not shown) may also be used to store invariant instruction sequences, such as start-up instruction sequences or basic input/output system (BIOS) sequences for operation of a keyboard (not shown).

The computing device 12 may further include a local storage device 26, which may be for example a hard disk, a CD-ROM, a non-volatile memory device (flash or memory stick) or any other device. Storage 26 may store operating system program files, application program files, and other files. Some of these files are stored on storage 26 using an installation program. For example, the processor 18 may execute computer-executable process steps of an installation program so that the processor 18 can properly execute the application program.

The computing device 12 also includes other devices and interfaces 24, which may include a display device interface, a keyboard interface, a pointing device interface and others.

The adapter 14 may be configured to handle both network and storage traffic. Various network and storage protocols/technologies may be used to handle network and storage traffic. Some common protocols are described below.

One common network protocol is Ethernet. The original Ethernet bus or star topology was developed for local area networks (LAN) to transfer data at 10 Mbps (mega bits per second). Newer Ethernet standards (for example, Fast Ethernet (100 Base-T), Gigabit Ethernet) and others support data transfer rates higher than 100 Mbps. The descriptions of the various aspects described herein are based on using Ethernet (which includes 100 Base-T and/or Gigabit Ethernet) as the network protocol. However, the adaptive aspects disclosed herein are not limited to any particular protocol, as long as the functional goals are met by an existing or new network protocol.

One commonly used storage technology to access storage systems is Fibre Channel (FC). Fibre Channel is a set of American National Standards Institute (ANSI) standards that provide a serial transmission protocol for storage and network protocols such as HIPPI, SCSI, IP, ATM and others. Fibre Channel supports three different topologies: point-to-point, arbitrated loop and fabric. The point-to-point topology attaches two devices directly. The arbitrated loop topology attaches devices in a loop. The fabric topology attaches computing devices directly (via HBAs) to a fabric, which are then connected to multiple devices. The Fibre Channel fabric topology allows several media types to be interconnected. Fibre Channel fabric devices include a node port or "N_Port" that manages Fabric connections. The N_port establishes a connection to a Fabric element (e.g., a switch) having a fabric port or F_port.

Fibre Channel over Ethernet (FCOE) has been developed to handle both Ethernet and Fibre Channel traffic in a storage area network (SAN). This functionality allows Fibre Channel to leverage high speed Ethernet networks while preserving the Fibre Channel framework. The adapter 14 shown in FIG. 1 may be configured to operate as an FCOE adapter and may be referred to as a FCOE adapter 14. The illustrated adapter 14, however, does not limit the scope of the present aspects. The present aspects may be practiced with adapters having different configurations.

iSCSI is an IP based storage networking standard for linking data storage facilities. By carrying SCSI commands over IP networks, iSCSI is used to facilitate data transfers over intranets and to manage storage over long distances. iSCSI can be used to transmit data over local area networks (LANs), wide area networks (WANs), or the Internet and can enable location-independent data storage and retrieval. The protocol allows clients to send SCSI commands (referred to as command data blocks (CDBs) to SCSI storage devices (may be referred to as targets) on remote servers. iSCSI is a SAN based protocol, allowing organizations to consolidate storage into data center storage arrays while providing hosts (such as database and web servers) with the illusion of locally attached disks. Unlike traditional Fibre Channel, which uses special-purpose cabling, iSCSI can be run over long distances using existing network infrastructure.

With continued reference to FIG. 1A, computing device 12 includes an adapter interface 22 that couples computing device 12 to the adapter 14 via a link 30. The adapter 14 interfaces with the computing device 12 via the link 30 and a host interface 32. In one aspect, the host interface 32 may be a PCI Express interface coupled to a PCI Express link (for example, 30).

The adapter 14 may also include a processor 34 that executes firmware instructions out of memory 36 to control overall adapter 14 operations. Direct memory access (DMA) module 33 may be used by adapter 14 to control access to link 30 for performing DMA operations i.e. to send data to processor 18 or receive data from processor 18.

The adapter 14 may also include storage 37, which may be for example non-volatile memory, such as flash memory, or any other device. The storage 37 may store executable instructions and operating parameters that can be used for controlling adapter operations.

The adapter 14 includes a network module 42 for handling network traffic via a link 50. In one aspect, the network interface 42 includes logic and circuitry for handling network packets, for example, Ethernet or any other type of network packets. The network module 42 may include memory buffers (not shown) to temporarily store information received from other network devices 54 and transmitted to other network devices 54.

The adapter 14 may also include a storage module 46 for handling storage traffic to and from storage devices 56 and 68A-68N. The storage interface 44 may further include memory buffers (not shown) to temporarily store information received from the storage devices 56 and transmitted by the adapter 14 to the storage devices 56 and 68A-68N. In one aspect, the storage module 46 is configured to process storage traffic according to the Fibre Channel storage protocol, or any other protocol, for example, iSCSI.

The adapter 14 also includes a network interface 52 that interfaces with a link 50 via one or more ports (not shown). The network interface 52 includes logic and circuitry to receive information via the link 50 and pass it to either the network module 42 or the storage module 46.

It is noteworthy that the adaptive aspects of the present disclosure are not limited to adapter 14 having both and separate network and storage modules. For example, adapter 14 may have an integrated module that can handle both network and storage traffic or adapter 14 may only have a storage module similar to a host bus adapter.

Adapter 14 may operate as an "initiator" for sending out input/output requests (i.e. read and write requests) to a target controller 58 via a target adapter 60. The target adapter 60 is similar to the initiator adapter 14 and includes a processor 61 that has access to memory 71 that may be used to cache data that is read from and written to storage 68A-68N. Target adapter 60 is coupled to network 16 via a link 51 similar to link 50. Target adapter 60 is coupled to the target controller 58 via a link 62 similar to link 30 described above. Target adapter 60 includes a DMA module 63 that manages access to link 62 to send and receive data using DMA transfer operations.

Target controller 58 may be a computing device similar to computing device 12 having a processor 64 and a memory 66. Target controller 58 manages storage devices 68A-68N for reading and writing data for I/O requests. Memory 66 may be used to operate as a cache for storing data for read requests, before read data is provided to a user. Memory 66 may also be used as a write cache to temporarily store data, before data is persistently stored at storage 68A-68N.

Enterprise applications, for example, backup and other application types, generate sequential I/O requests. Processing the sequential I/O requests in conventional system causes inefficiency in cache usage increasing the latency in processing I/O requests. For example, for sequential read requests, the target controller 58 typically has to obtain data from storage 68A-68N but the data is typically only read once. When the cache is used to store the data, it gets quickly filled up. This causes delay not just for the application that issues the I/O requests but for other applications that may be sharing the cache for their LUNs. The same problem arises for write requests. For example, for write requests generated by a backup application, the cache gets filled up very quickly with data that needs to be persisted and may not be accessed again in the near future. The systems and processes provided herein overcome this inefficiency, as described below in detail.

Figure 1B:
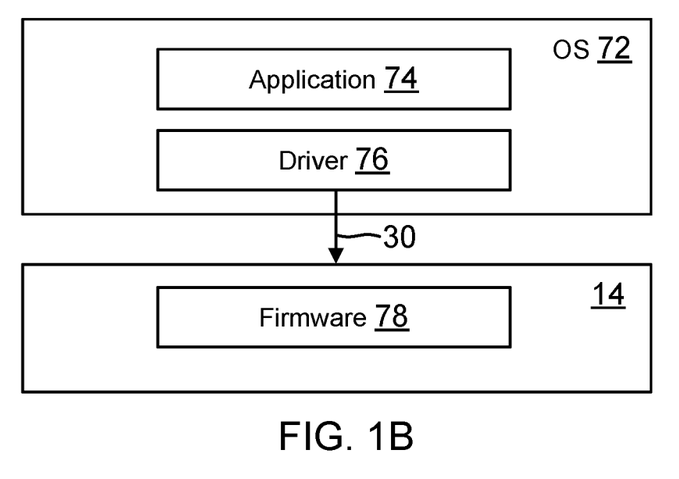
FIG. 1B is a processor executable, software architecture used by the system of the present disclosure.

Software Architecture:

FIG. 1B shows a software architecture that may be used by the components of system 100. For example, the software architecture of FIG. 1B includes an operating system (OS) 72 that controls the overall operation of a computing device, for example, 12 and target controller 58. OS 72 may be Windows based, Linux based, Solaris based or any other OS type (without derogation of any third party trademark rights).

A computing device may also execute an application 74. Application 74 when executed by computing device 12 may be a client application, for example, a backup application, a database application, web server, email application and others. The application 74 may be used to generate a request to read and write information.

Application 74 may also be a management application executed by a computing device used as a management console (not shown) for managing the various components system 100. In one aspect, application 74 may be used to configure a storage space as a logical entity (logical unit number (LUN). Each LUN is uniquely identified by an identifier (LUN ID) and is associated with physical storage space. A LUN is typically divided into logical block addresses (LBAs) that are used by an application to read and write data to storage locations. The LBAs are mapped with actual physical storage to read and write data. To generate an I/O request to read or write data at a storage location, adapter 14 uses a LUN identifier and LBA range.

Application 74 when executed by the target controller 58 may be an application for managing various storage devices 68A-68N. To communicate with adapter 14 (or 60), application 74 uses a driver 76. The driver may be referred to as an adapter driver. To control the operations of adapter 14 (and target adapter 60), an adapter processor executes firmware instructions out of adapter memory (36 or 71).

In one aspect, a system and process is provided where a pattern of a read and/or write request is indicated in a command that is received by the target adapter 60. The target adapter 60 determines if a read request is sequential. If yes, then the target adapter 60 notifies the target controller 58 to read ahead blocks that may be affected by the sequential read operation. For a write operation, the target adapter 60 determines if a write operation is part of a sequential series of write operations and if the data that is to be written will be accessed in the near future. If yes, then cache is not reserved for the write request.

In one aspect, the request pattern may be indicated as part of the I/O command. For example, unused bits of certain fields of a Fibre Channel header (for example, the OX-ID field) that is generated by the initiator adapter may be used to indicate the I/O request pattern. Details of processing read and write requests are provided below with respect to FIGS. 2 and 3.

Figure 2:
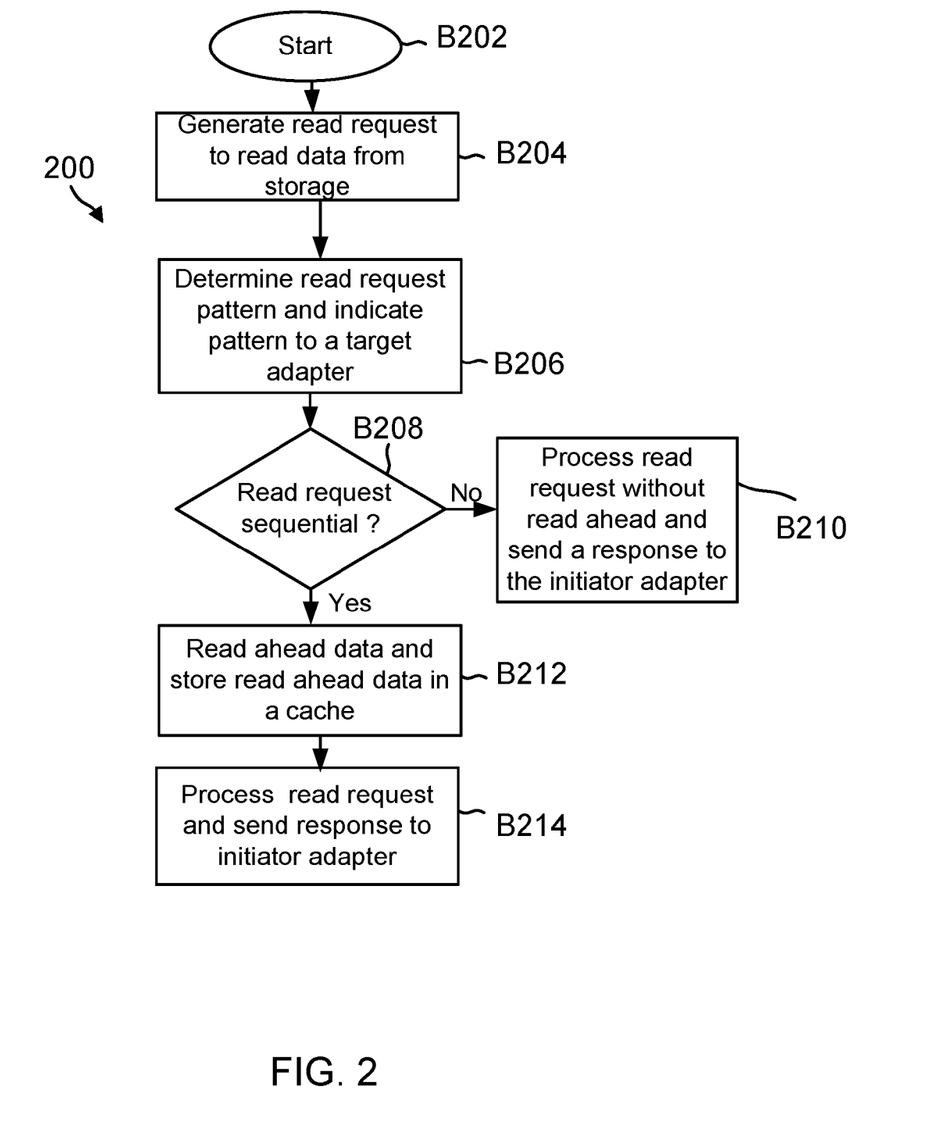
FIG. 2 illustrates a process flow for a read request, according to one aspect of the present disclosure.

Process Flow:

FIG. 2 shows a process 200 for processing read requests to read data stored on behalf of the computing device 12, according to one aspect of the present disclosure. The process begins in block B202, when application 74 is initialized at computing device 12. Application 12 generates a read request to read data stored at storage 68A-68N. The read request specifies a logical block address (LBA) range and a logical unit identifier (LUN). The read request may be submitted to driver 76.

In block B206, a pattern for the read request is determined. This may be determined by the driver 76 or indicated by application 74. The read request pattern indicates if the read request is part of sequential read requests, for example, to read data for a backup operation or if the read request is a random request and not sequential in nature. The firmware 78 of the initiator adapter 14 prepares a packet with the read request and indicates the read request pattern to the target adapter 60. In one aspect, the firmware 78 of the initiator adapter sets a bit in a network packet indicating that the read request is either random or sequential. As an example, where Fibre Channel or FCoE is used for sending the read request, then an unused bit in an OX_ID field (originator field) 408F (FIG. 4B) in an FCP (Fibre Channel Protocol) input/output command is set to indicate the request pattern. An example of a FC header is shown in FIG. 4B and described below.

In block B208, the target adapter 60 receives a packet and determines if the read request is sequential in nature. The term sequential refers to the read request itself and not to the sequence of packets for a read request. For example, assume there is a read request R1 with packets P1-P8 and there are other requests R2-RN. The target adapter 60 determines if the received request is part of a sequence, i.e. for example, R1, R2 and R3. This is different from determining if the packets within a request are sequential that is determined by a sequence identifier 408D and a sequence count 408E of a FC header, as shown in FIG. 4B.

If the read request is random, then in block B210, it is processed without a "read ahead" operation that is described below. The target adapter 60 provides the requested data and a response to the initiator adapter 14.

When the read request is sequential in nature, then in block B212, the target adapter 60 determines what other data may be involved for other sequential read requests. As an example, the target adapter 60 uses the LBA and LUN ID in the read request to predict what the other LBA range may be affected by a sequential read request. The target adapter 60 then reads that data from storage 68A-68N before the associated read request is received; hence the term read ahead and stores the data at a cache. The cache may be at the target adapter 60, for example, at memory 71 or at the target controller memory 66. Thereafter, in block B214, the read request is processed and a response is sent to the initiator adapter 14.

Figure 3:
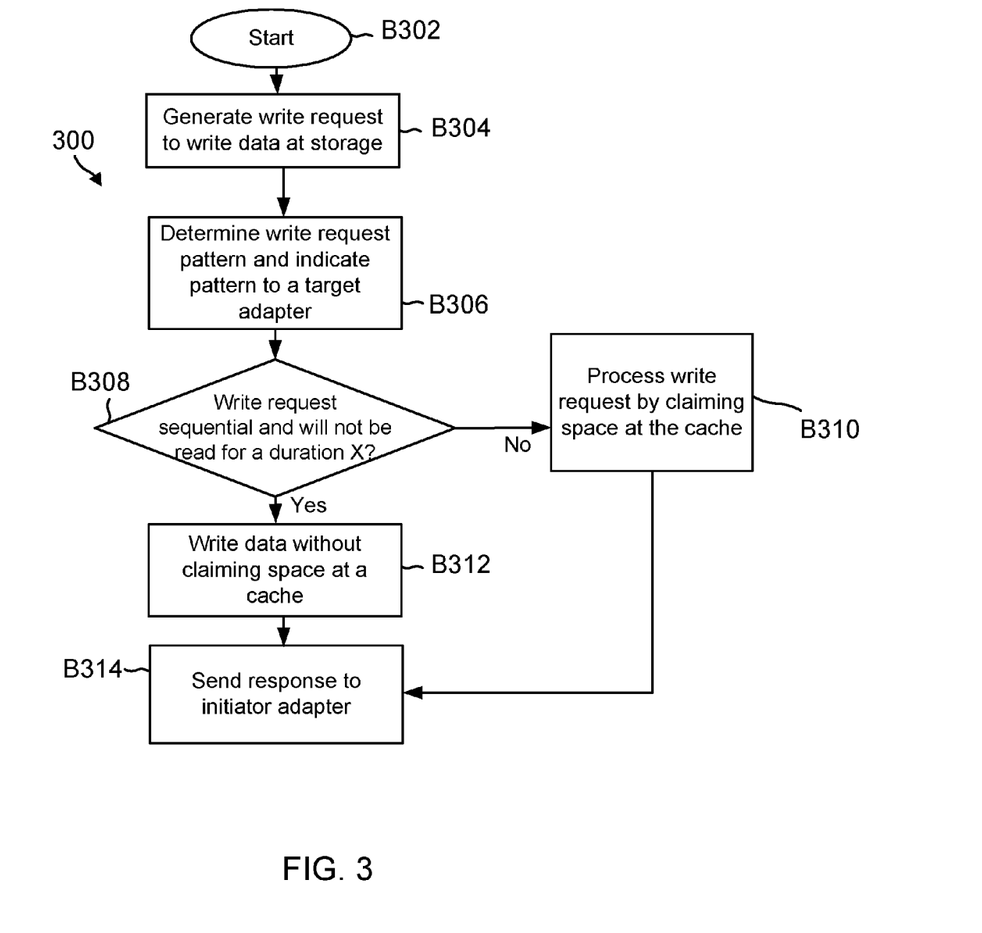
FIG. 3 illustrates a process flow for a write request, according to one aspect of the present disclosure.

FIG. 3 shows a process 300 for processing write requests to write data on behalf of computing device 12, according to one aspect of the present disclosure. The process begins in block B302, when application 74 is initialized at computing device 12. In block B304, application 12 generates a write request to write data at storage 68A-68N. The write request specifies a LBA range and a LUN. The write request may be submitted to driver 76.

In block B306, a pattern for the write request is determined. This may be determined by the driver 76 or indicated by application 74. The write request pattern indicates if the write request is part of a sequence of write requests, for example, to write data for a backup operation or if the write request is a random request and not sequential in nature. The pattern also determines if the data associated with the write request will be read anytime in the future. This may be defined by a duration value, for example, 24 hours. The firmware 78 of the initiator adapter 14 indicates the write request pattern to the target adapter 60. In one aspect, the firmware 78 of the initiator adapter sets a bit in a network packet indicating that the write request is either random or sequential. As an example, where Fibre Channel or FCoE is being used for communication, then an unused bit in the OX_ID field (originator field) 408F in an FCP (Fibre Channel Protocol) input/output command. An example of a FC header is shown in FIG. 4B and described below.

In block B308, the target adapter 60 determines if the write request is sequential in nature and if the data associated with the write request will be accessed or read within a threshold duration. The target adapter 60 can determine if the data will be read within a certain duration based on the request type. For example, a write request from a backup application will typically not be read immediately. The term sequential is applicable to the write request itself and not just the packets for one write request. For example, assume there is a write request W1 with packets P1-P8 and there are other requests W2-WN. The target adapter 60 determines if the received write request is part of a sequence, i.e. for example, W1, W2 and W3. This is different from determining if the packets within a write request are sequential that is determined by the sequence identifier 408D and sequence count 408E of a FC header, as shown in FIG. 4B. If the write request is random or if the data will be read within the set duration, then it is processed in block B310, after storage space at a cache is claimed i.e. the data is first written to a cache and then moved to storage 68A-68N. The target adapter 60 then provides a response to the initiator adapter 14 in block B314.

When the write request is sequential in nature and will not be read within a defined duration, then in block B312, the target adapter 60 writes the data at storage 68A-68N without claiming any storage space at the cache. Thereafter, in block B314, a response is sent to the initiator adapter 14.

Figure 4A:
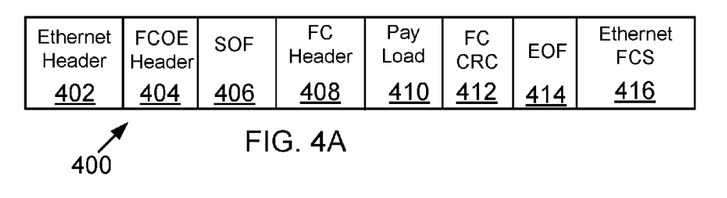
FIG. 4A shows an example of a Fibre Channel over Ethernet (FCoE) header, used according to one aspect of the present disclosure.
Figure 4B:
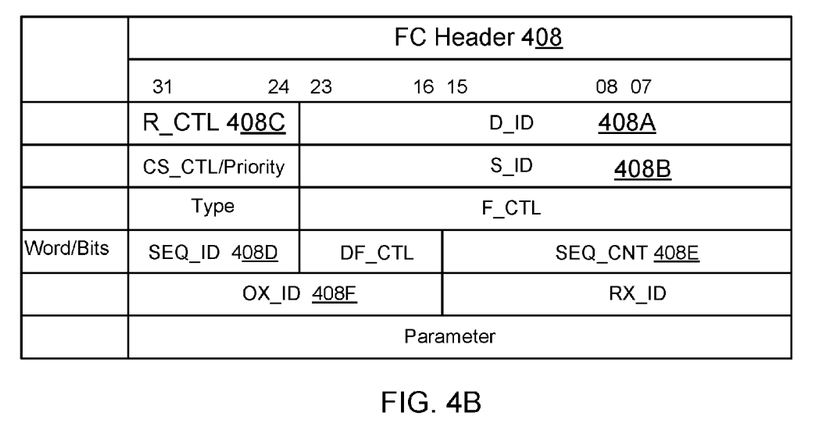
FIG. 4B shows an example of Fibre Channel header, used according to one aspect of the present disclosure.

Frame Format:

FIG. 4A shows an example of an FCoE packet format 400 for sending I/O requests, according to the various aspects of the present disclosure. The FCoE packet 400 includes an Ethernet header 402. In one embodiment, the Ethernet header 402 includes the Ethernet type, may be fourteen bytes in length, for example. The Ethernet header may also include optional Tag fields (not shown). The FCoE packet 400 also includes an FCoE header 404 that includes a number of reserved fields. A start of frame (SOF) 406 indicates the beginning of the embedded Fibre Channel frame and may be one byte, for example.

The FCoE packet 400 may also include a Fibre Channel header (FC Header) 408 that may be 24 bytes long with a payload 410. The payload may include a read or write request as described above with respect to FIGS. 2 and 3. Fibre Channel cyclic redundancy code (CRC) 412 may be 4 bytes and the Fibre Channel end of frame (EOF) 414 may be 1 byte in size. The EOF 414 indicates the end of the embedded Fibre Channel frame. The Ethernet FCS 416 is inserted after the Fibre Channel EOF 414.

FIG. 4B shows an example of the FC header 408 of FIG. 4A. The following frame header fields that are used in the present methods are:

D_ID 408A—A 24-bit Fibre Channel frame header field that contains the destination address for a frame.

S_ID 408B—A 24-bit Fibre Channel frame header field that contains the source address for a frame.

R_CTL 408C—A routing control flag in a Fibre Channel header.

SEQD_ID 408D: Provides a sequence identifier for a frame

SEQ_CNT 408E: Indicates the frame count within a sequence.

OX-ID 408F: This field indicates an originator of a frame. This field may also be used to indicate a read or write request pattern, as described above with respect to FIGS. 2 and 3.

In one aspect, by understanding the nature of read and write requests, the target adapter 60 is able to process information efficiently by either reading ahead, claiming space at a cache or not claiming space at a cache. Furthermore, because the target adapter determines the nature of the read and write request, the target controller processor 64 resources are saved because it does not have to determine the request patterns.

The above description presents the best mode contemplated for carrying out the present aspects, and of the manner and process of making and using them, in such full, clear, concise, and exact terms as to enable any person skilled in the art to which they pertain to make and use these aspects. These aspects are, however, susceptible to modifications and alternate constructions from that discussed above that are fully equivalent. Consequently, these aspects are not limited to the particular aspects disclosed. On the contrary, these aspects cover all modifications and alternate constructions coming within the spirit and scope of the aspects as generally expressed by the following claims, which particularly point out and distinctly claim the subject matter of the aspects.

What is claimed is:

1. A machine implemented method for processing an input/output (I/O) request sent by an initiator adapter to a target adapter coupled to a target controller, comprising:

generating the I/O request by the initiator adapter of a computing device that interfaces with the target adapter;

indicating by the initiator adapter an I/O request pattern to the target adapter, where the I/O request pattern indicates if the I/O request is sequential in nature;

when the I/O request is a read request that is sequential in nature as indicated by the I/O request pattern, the target adapter notifying the target controller to read ahead data associated with other sequential read requests;

storing the read ahead data at a cache such that data for the other sequential read requests is provided from the cache instead of a storage device managed by the target controller; and when the I/O request is a sequential write request as indicated by the I/O request pattern that also indicates that data associated with the sequential write request is to be accessed within a threshold duration, then processing the sequential write request by claiming space at the cache.

2. The method of claim 1, wherein the I/O request is the sequential write request and the I/O request pattern also indicates that the data associated with the sequential write request is not to be accessed within the threshold duration.

3. The method of claim 2, wherein the sequential write request is processed without claiming any cache space.

4. The method of claim 1, wherein when the read request is not sequential, then the read request is processed without a read ahead operation.

5. The method of claim 1, wherein a field in a header is used by the initiator adapter to indicate the I/O request pattern.

6. The method of claim 5, wherein an unused bit of an originator identifier of a Fibre Channel header is used by the initiator to indicate the I/O pattern.

7. A non-transitory, machine readable storage medium having stored thereon instructions for performing a method for processing an input/output (I/O) request sent by an initiator adapter to a target adapter coupled to a target controller, comprising machine executable code which when executed by at least one machine, causes the machine to:

generate the I/O request by the initiator adapter of a computing device that interfaces with the target adapter;

indicate by the initiator adapter an I/O request pattern to the target adapter, where the I/O request pattern indicates if the I/O request is sequential in nature;

when the I/O request is a read request that is sequential in nature as indicated by the I/O request pattern, the target adapter notifies the target controller to read ahead data associated with other sequential read requests;

store the read ahead data at a cache such that data for the other sequential read requests is provided from the cache instead of a storage device managed by the target controller; and when the I/O request is a sequential write request as indicated by the I/O request pattern that also indicates that data associated with the sequential write request is to be accessed within a threshold duration, then the sequential write request is processed by claiming space at the cache.

8. The non-transitory, storage medium of claim 7, wherein the I/O request is the sequential write request and the I/O request pattern also indicates that the data associated with the sequential write request is not to be accessed within the threshold duration.

9. The non-transitory, storage medium of claim 8, wherein the sequential write request is processed without claiming any cache space.

10. The non-transitory, storage medium of claim 7, wherein when the read request is not sequential, then the read request is processed without a read ahead operation.

11. The non-transitory, storage medium of claim 7, wherein a field in a header is used by the initiator adapter to indicate the I/O request pattern.

12. The non-transitory, storage medium of claim 11, wherein an unused bit of an originator identifier of a Fibre Channel header is used by the initiator to indicate the I/O pattern.

13. A system comprising:

an initiator adapter coupled to a computing device having a processor executing instructions out of a memory; and a target adapter communicating with the initiator adapter via a network connect, the target adapter coupled to a target controller that manages a storage device for storing and retrieving data on behalf of the initiator adapter;

wherein the initiator adapter generates an input/out (I/O) request; and indicates an I/O request pattern to the target adapter, where the I/O request pattern indicates if the I/O request is sequential in nature;

wherein when the I/O request is a read request that is sequential in nature as indicated by the I/O request pattern, the target adapter notifies the target controller to read ahead data associated with other sequential read requests; and stores the read ahead data at a cache such that data for the other sequential read requests is provided from the cache instead of a storage device managed by the target controller; and when the I/O request is a sequential write request as indicated by the I/O request pattern that also indicates that data associated with the sequential write request is to be accessed within a threshold duration, then the sequential write request is processed by claiming space at the cache.

14. The system of claim 13, wherein the I/O request is the sequential write request and the I/O request pattern also indicates that the data associated with the sequential write request is not to be accessed within the threshold duration.

15. The system of claim 14, wherein the sequential write request is processed without claiming any cache space.

16. The system of claim 13, wherein a field in a header is used by the initiator adapter to indicate the I/O request pattern.

17. The system of claim 16, wherein an unused bit of an originator identifier of a Fibre Channel header is used by the initiator to indicate the I/O pattern.

18. The method of claim 1, wherein the cache is located at the target adapter.

19. The non-transitory, storage medium of claim 7, wherein the cache is located at the target adapter.

20. The system of claim 13, wherein the cache is located at the target adapter.

* * * * *